(12) United States Patent
Chen et al.

(10) Patent No.: US 8,627,469 B1
(45) Date of Patent: Jan. 7, 2014

(54) SYSTEMS AND METHODS FOR USING ACQUISITIONAL CONTEXTS TO PREVENT FALSE-POSITIVE MALWARE CLASSIFICATIONS

(75) Inventors: Joseph Chen, Los Angeles, CA (US); Jeffrey Wilhelm, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/420,492

(22) Filed: Mar. 14, 2012

(51) Int. Cl.
*G06F 11/00* (2006.01)
(52) U.S. Cl.
USPC .......................................................... 726/22
(58) Field of Classification Search
USPC .......................................................... 726/22
See application file for complete search history.

(56) References Cited

U.S. PATENT DOCUMENTS

| | | | |
|---|---|---|---|
| 7,831,412 B1 | 11/2010 | Sobel et al. | |
| 7,966,278 B1 | 6/2011 | Satish | |
| 2004/0205167 A1 | 10/2004 | Grumann | |
| 2005/0021733 A1 | 1/2005 | Clinton et al. | |
| 2005/0283622 A1 | 12/2005 | Hall et al. | |
| 2007/0016953 A1 | 1/2007 | Morris et al. | |
| 2007/0300215 A1 | 12/2007 | Bardsley | |
| 2008/0141240 A1 | 6/2008 | Uthe | |
| 2009/0044024 A1* | 2/2009 | Oberheide et al. | 713/188 |
| 2009/0133126 A1 | 5/2009 | Jang et al. | |
| 2010/0115040 A1* | 5/2010 | Sargent et al. | 709/206 |
| 2011/0246753 A1* | 10/2011 | Thomas | 713/1 |

OTHER PUBLICATIONS

Sourabh Satish et al.; Social Trust Based Security Model; Mar. 31, 2006; U.S. Appl. No. 11/394,846.
Sourabh Satish; Method for Determining the Health Impact of an Application Based on Information Obtained from Like-Profiled Computing Systems Using Clustering; Mar. 27, 2008; U.S. Appl. No. 12/056,379.
Sourabh Satish; Systems and methods for Determining and Quantifying the Impact of an Application on the Health of a System; U.S. Appl. No. 12/049,751, filed Mar. 17, 2008.
Non-Final Office Action received in related U.S. Appl. No. 12/049,751; Jun. 24, 2011.
Final Office Action received in related U.S. Appl. No. 12/049,751; Jan. 19, 2012.
Carey S. Nachenberg; Systems and Methods for Using Reputation Data to Detect Shared-Object-Based Security Threats; U.S. Appl. No. 12/415,834, filed Mar. 31, 2009.
Non-Final Office Action received in related U.S. Appl. No. 12/415,834; Oct. 11, 2011.

* cited by examiner

*Primary Examiner* — Cordelia Zecher
(74) *Attorney, Agent, or Firm* — ALG Intellectual Property, LLC (57) ABSTRACT

A method for using acquisitional contexts to prevent false-positive malware classifications. The method may include (1) receiving, from at least one client-side computing device within a community of users, contextual information associated with a file, (2) determining, based at least in part on the contextual information received from the client-side computing device, a reputation rating for the file, and (3) providing the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy. Various other methods and systems are also disclosed.

20 Claims, 8 Drawing Sheets

```
Contextual Information
       500
```

File Name: example.exe
File Hash: 0x0349EF9A

Acquisition Method: Browser Download

Source URL: www.example.com/downloads/

Source IP Address: 75.169.229.19

Trust Determination: Trustworthy

SYSTEMS AND METHODS FOR USING ACQUISITIONAL CONTEXTS TO PREVENT FALSE-POSITIVE MALWARE CLASSIFICATIONS

BACKGROUND

In recent years, authors of malicious software ("malware") have attempted to proliferate malware by generating thousands or potentially millions of variations of a malicious file. Unfortunately, because many existing antivirus technologies detect malware by detecting or identifying unique digital signatures or fingerprints associated with known-malicious files, malware authors may avoid detection by only distributing new (i.e., unique) or repacked versions of malicious files.

In light of this, at least one security-software vendor has begun investigating and implementing reputation-based security systems. In a reputation-based security system, a security-software vendor may attempt to determine whether a file represents malware by collecting, aggregating, and analyzing data from potentially millions of user devices within a community, such as the security-software vendor's user base. For example, by determining a file's source, age, and prevalence within the community, among other details, a security-software vendor may gain a fairly accurate understanding as to whether the file represents malware.

In a typical reputation-based security system, a file that has a low prevalence and/or a file for which little is known about its source of origin or age may be classified as malware since these characteristics are common among malware. Because of this, however, typical reputation-based security systems may be unable to accurately distinguish between malware and legitimate files that have a low prevalence and/or for which little is known about their source of origin, which may in turn result in such systems mistakenly classifying legitimate files as malware. These mistakes, known as "false positives," may be extremely disruptive and costly for an enterprise since they can result in the deletion or removal of legitimate, and potentially essential, files and software from computing devices within the enterprise. Accordingly, the instant disclosure identifies and addresses a need for additional and improved systems and methods for preventing false-positive malware classifications.

SUMMARY

As will be described in greater detail below, the instant disclosure generally relates to systems and methods for ensuring that a file that is trusted on one computing device due to the context in which the file was acquired (e.g., from a trusted source) is also trusted on an additional computing device even though the file is acquired at the additional computing device via a context that is insufficient to determine that the file is trustworthy (e.g., from an untrusted or unknown source). In one example, a computer-implemented method for performing such a task may include (1) receiving, from at least one client-side computing device within a community of users, contextual information associated with a file, (2) determining, based at least in part on the contextual information received from the client-side computing device, a reputation rating for the file, and (3) providing the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy. In this example, the contextual information may identify a context in which the client-side computing device acquired the file and indicate that the client-side computing device determined that the file was trustworthy due to the context in which the client-side computing device acquired the file.

The context in which the client-side computing device acquired the file may include a trusted source from which the client-side computing device acquired the file, a trusted domain name from which the client-side computing device acquired the file, a trusted hostname from which the client-side computing device acquired the file, and/or a trusted uniform resource locator (URL) from which the client-side computing device acquired the file.

In some examples, the step of determining the reputation rating for the file may include identifying a reputation rating associated with the context in which the client-side computing device acquired the file and then calculating, based at least in part on this reputation rating, a reputation rating for the file. Additionally or alternatively, the step of determining the reputation rating for the file may include calculating a hash that represents the file and then associating the reputation rating for the file with the hash. The step of determining the reputation rating for the file may also include verifying that the file is not a known-malicious file.

In some embodiments, the client-side computing device in the above example may have determined that the file was trustworthy based at least in part on reputation information associated with the context in which the file was acquired. For example, the client-side computing device may have determined that the file was trustworthy due to the context in which the client-side computing device acquired the file by (1) obtaining reputation information for a source from which the client-side computing device acquired the file that indicates that the source was trustworthy and then (2) determining, based at least in part on the reputation information for the source from which the client-side computing device acquired the file, that the file was trustworthy.

In another example, a computer-implemented method for using acquisitional contexts to prevent false-positive malware classifications may include (1) identifying, at a client-side computing device, a file, (2) requesting a reputation rating for the file from a server-side computing device, (3) receiving the reputation rating for the file from the server-side computing device, and (4) determining, based at least in part on the reputation rating received from the server-side computing device, that the file is trustworthy despite the client-side computing device having acquired the file via a context that is insufficient to determine that the file is trustworthy. In this example, the reputation rating received from the server-side computing device may be based at least in part on an analysis of contextual information received from at least one other client-side computing device within a community of users that indicates that the other client-side computing device determined that a prior instance of the file was trustworthy due to a context in which the other client-side computing device acquired the prior instance of the file.

In one embodiment, a system for implementing the above-described methods may include a context-receiving module programmed to receive, at a server-side computing device from at least one client-side computing device within a community of users, contextual information associated with a file. The system may also include a reputation-determining module programmed to determine, based at least in part on the contextual information received from the client-side computing device, a reputation rating for the file. The system may also include a providing module programmed to provide the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy. Furthermore, the system may include at least one processor configured to execute the context-receiving module, the reputation-determining module, and the providing module.

In at least one embodiment, the system may further include a file-identification module programmed to identify, at the additional client-side computing device, an additional instance of the file. The system may also include a reputation-requesting module programmed to request a reputation rating for the additional instance of the file from the server-side computing device. The system may also include a reputation-receiving module programmed to receive the reputation rating for the additional instance of the file from the server-side computing device. The system may also include a trust-determining module programmed to determine, based at least in part on the reputation rating received from the server-side computing device, that the additional instance of the file is trustworthy despite the additional client-side computing device having acquired the additional instance of the file via a context that is insufficient to determine that the additional instance of the file is trustworthy.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, from at least one client-side computing device within a community of users, contextual information associated with a file, (2) determine, based at least in part on the contextual information received from the client-side computing device, a reputation rating for the file, and (3) provide the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy.

As will be explained in greater detail below, by determining reputation ratings for files based on information that identifies the context in which such files were acquired, the systems and methods described herein may prevent reputation-based security systems from falsely classifying legitimate files as malware. Furthermore, by propagating such reputation ratings within a community of users, the systems and methods described herein may ensure that a file that is trusted on one computing device due to the context in which the file was acquired (e.g., a trusted source) is also trusted on an additional computing device even if the file is acquired at the additional computing device via a context (e.g., an untrusted source) that is insufficient to determine that the file is trustworthy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
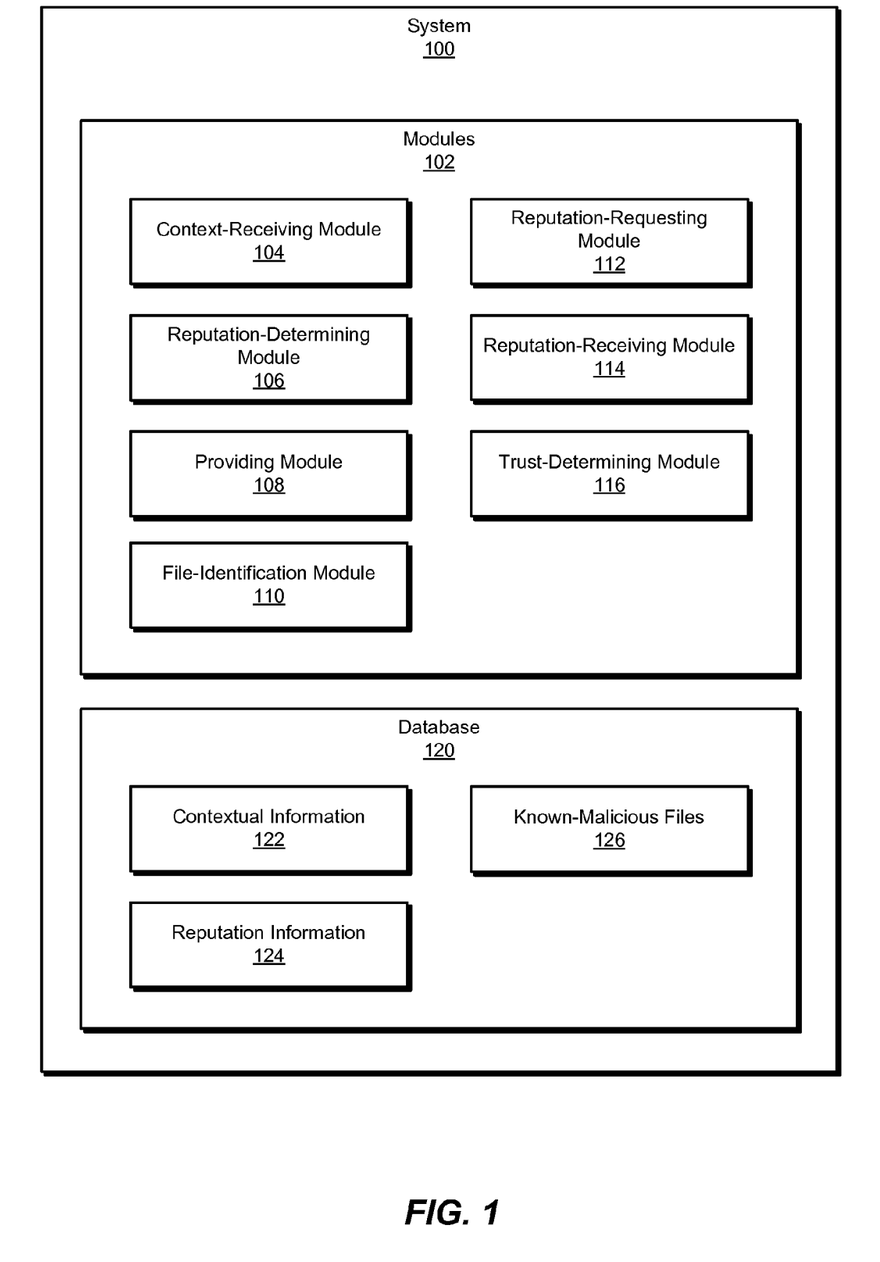
FIG. 1 is a block diagram of an exemplary system for using acquisitional contexts to prevent false-positive malware classifications.
Figure 2:
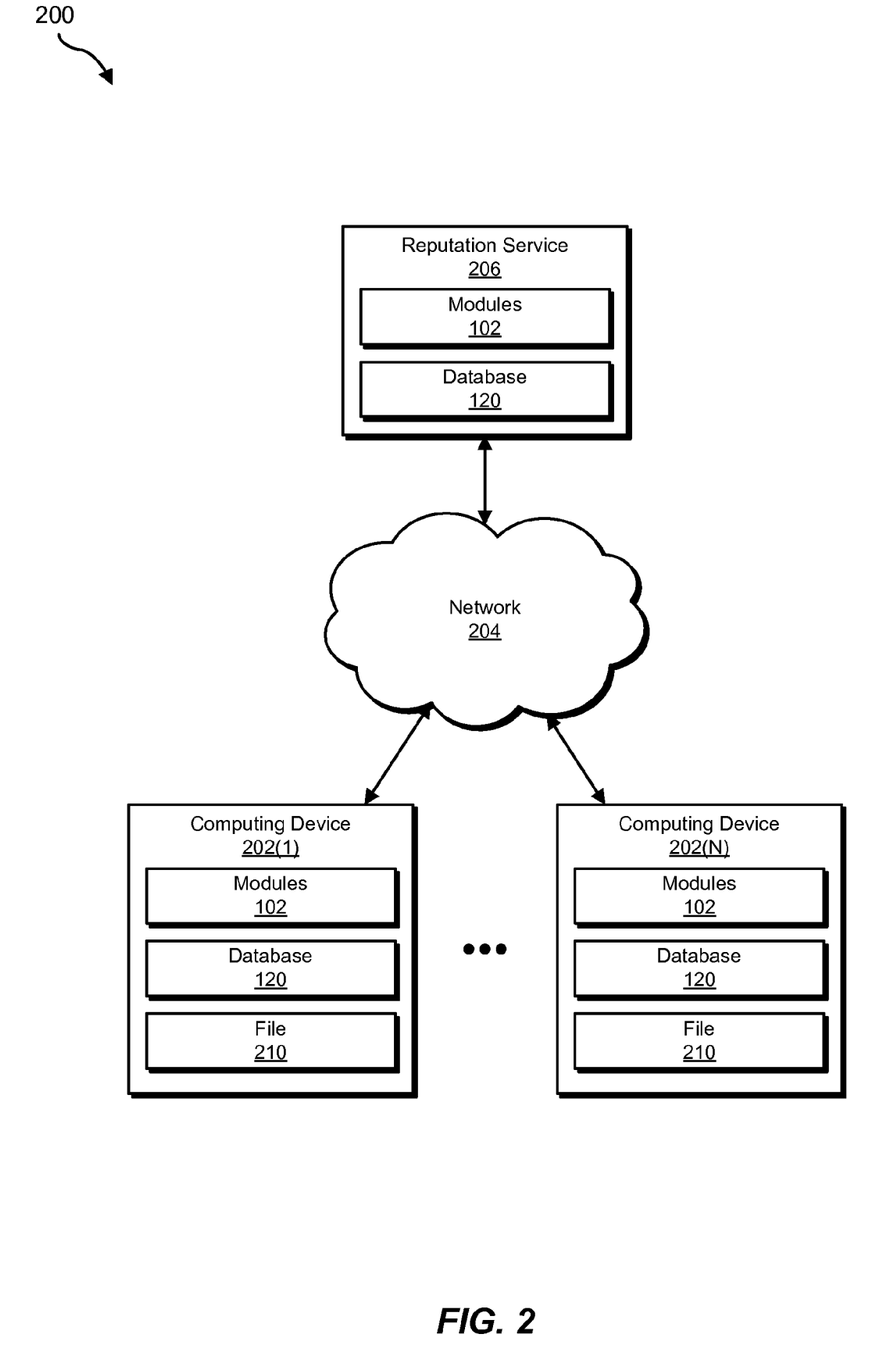
FIG. 2 is a block diagram of an exemplary system for using acquisitional contexts to prevent false-positive malware classifications.

The following will provide, with reference to FIGS. 1-2, detailed descriptions of exemplary systems for using acquisitional contexts to prevent false-positive malware classifications. Detailed descriptions of corresponding computer-implemented methods will also be provided in connection with FIGS. 3-4. In addition, detailed descriptions of exemplary contextual information and reputation information will be provided in connection with FIGS. 5 and 6, respectively. Furthermore, detailed descriptions of an exemplary computing system and network architecture capable of implementing one or more of the embodiments described herein will be provided in connection with FIGS. 7 and 8, respectively.

FIG. 1 is a block diagram of an exemplary system 100 for using acquisitional contexts to prevent false-positive malware classifications. As illustrated in this figure, exemplary system 100 may include one or more modules 102 for performing one or more tasks. For example, and as will be explained in greater detail below, exemplary system 100 may include a context-receiving module 104 programmed to receive, at a server-side computing device from at least one client-side computing device within a community of users, contextual information associated with a file. Exemplary system 100 may also include a reputation-determining module 106 programmed to determine, based at least in part on the contextual information received from the client-side computing device, a reputation rating for the file.

In addition, and as will be described in greater detail below, exemplary system 100 may include a providing module 108 programmed to provide the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy.

Exemplary system 100 may also include a file-identification module 110 programmed to identify, at the additional client-side computing device, an additional instance of the file. Additionally, exemplary system 100 may include a reputation-requesting module 112 programmed to request a reputation rating for the additional instance of the file from the server-side computing device. Exemplary system 100 may also include a reputation-receiving module 114 programmed to receive the reputation rating for the additional instance of the file from the server-side computing device. Furthermore, exemplary system 100 may include a trust-determining module 116 programmed to determine, based at least in part on the reputation rating received from the server-side computing device, that the additional instance of the file is trustworthy despite the additional client-side computing device having acquired the additional instance of the file via a context that is insufficient to determine that the additional instance of the file is trustworthy. Although illustrated as separate elements, one or more of modules 102 in FIG. 1 may represent portions of a single module or application.

In certain embodiments, one or more of modules 102 in FIG. 1 may represent one or more software applications or programs (such as a security-software application) that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or reputation service 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store contextual information 122 (an example of which includes contextual information 500 in FIG. 5), reputation information 124 (an example of which includes reputation information 600 in FIG. 6), and information that identifies known-malicious files 126.

Database 120 may represent portions of a single database or computing device or a plurality of databases or computing devices. For example, database 120 may represent a portion of computing devices 202(1)-(N) and/or reputation service 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as reputation service 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of computing devices 202(1)-(N) in communication with a reputation service 206 via a network 204.

In one embodiment, one or more of modules 102 from FIG. 1 may, when executed by at least one processor of computing devices 202(1)-(N) and/or reputation service 206, enable computing devices 202(1)-(N) and/or reputation service 206 to use acquisitional contexts to prevent false-positive malware classifications. For example, and as will be described in greater detail below, one or more of modules 102 may cause reputation service 206 to (1) receive, from at least one client-side computing device within a community of users (e.g., computing device 202(N)), contextual information associated with a file (e.g., file 210), (2) determine, based at least in part on the contextual information received from the client-side computing device, a reputation rating for the file, and (3) provide the reputation rating for the file to at least one additional client-side computing device within the community (e.g., computing devices 202(1)-(N—1)) in order to prevent the additional client-side computing device from falsely classifying the file as untrustworthy due to acquiring an additional instance of the file via a context that is insufficient to determine that the additional instance of the file is trustworthy. In this example, the contextual information may identify a context in which the client-side computing device acquired the file and may indicate that the client-side computing device determined that the file was trustworthy due to the context in which the client-side computing device acquired the file.

In another embodiment, one or more of modules 102 from FIG. 1 may, when executed by at least one processor of computing devices 202(1)-(N) and/or reputation service 206, enable computing devices 202(1)-(N) and/or reputation service 206 to use acquisitional contexts to prevent false-positive malware classifications by causing computing device 202(1) to (1) identify a file (e.g., file 210), (2) request a reputation rating for the file from a server-side computing device (e.g., reputation service 206), (3) receive the reputation rating for the file from the server-side computing device, and (4) determine, based at least in part on the reputation rating received from the server-side computing device, that the file is trustworthy despite having acquired the file via a context that is insufficient to determine that the file is trustworthy. In this example, the reputation rating received from the server-side computing device may be based at least in part on an analysis of contextual information received from at least one other client-side computing device within a community of users (e.g., computing device 202(N)) that indicates that the other client-side computing device determined that a prior instance of the file (e.g., file 210 located on computing device 202(N)) was trustworthy due to a context in which the other client-side computing device acquired the prior instance of the file.

Computing devices 202(1)-(N) generally represent any type or form of computing device capable of reading computer-executable instructions. Examples of computing devices 202(1)-(N) include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device. In one example, computing devices 202(1)-(N) may represent computing devices of users within a community (such as the user base of a security-software vendor) that interact with a reputation service.

Reputation service 206 generally represents any type or form of computing device that is capable of storing, managing, and/or processing data. Examples of reputation service 206 include, without limitation, application servers and database servers configured to provide various database services and/or run certain software applications. In at least one embodiment, reputation service 206 may represent a reputation service that provides reputation information to one or more client-side computing devices and/or that collects, aggregates, and/or analyzes data (e.g., contextual information) from computing devices 202(1)-(N).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing devices 202(1)-(N) and reputation service 206.

Figure 3:
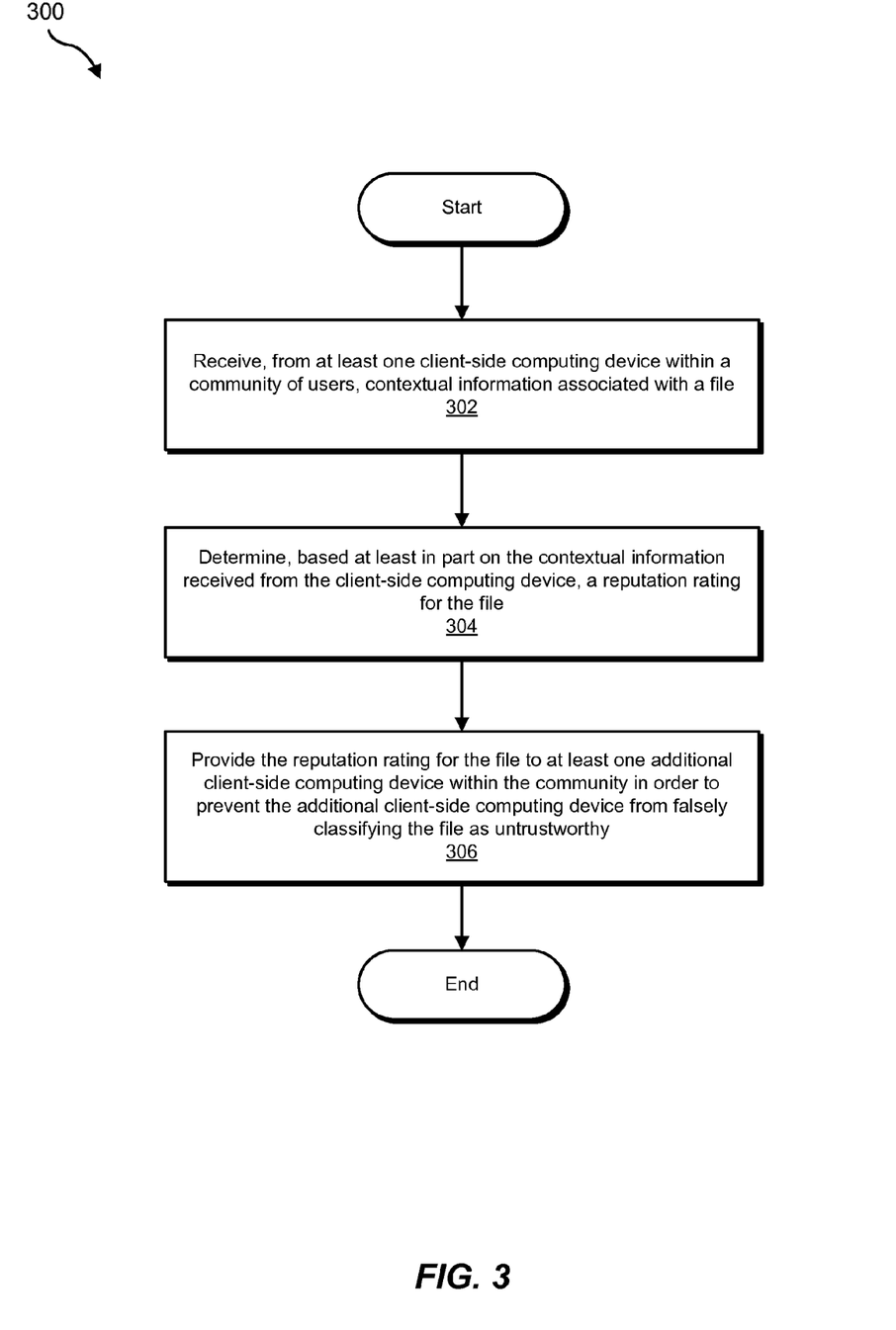
FIG. 3 is a flow diagram of an exemplary method for using acquisitional contexts to prevent false-positive malware classifications.

FIG. 3 is a flow diagram of an exemplary computer-implemented method 300 for using acquisitional contexts to prevent false-positive malware classifications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the systems described herein may receive, from at least one client-side computing device within a community of users, contextual information associated with a file. For example, at step 302, context-receiving module 104 may, as part of reputation service 206 in FIG. 2, receive contextual information associated with file 210.

The term "file," as used herein, may generally refer to any file that has a low prevalence within a community of users, is associated with a limited amount of reputation information, and/or is associated with reputation information that is still developing. Examples of files include, without limitation, a newly created file, a file seen for the first time within a community of users, and/or a file seen by a limited number of users within a community. For example, a file may include a newly created executable file, an executable file that has recently been made publicly available, and/or an executable file whose availability is limited (e.g., a beta release).

In some examples, the contextual information received in step 302 may include information that identifies or describes a context in which a client-side computing device acquired a file and/or may indicate that a client-side computing device determined that a file was trustworthy due to the context in which the client-side computing device acquired the file (e.g., the fact that the client-side computing device acquired the file from a trusted source may indicate that the file is also trustworthy).

As used herein, the term "context" may generally refer to the set of circumstances surrounding the acquisition of a file, such as information regarding how the file was acquired, the source of the file, and/or attributes of the client-side computing device that acquired the file. For example, the "context" in which a file was acquired may refer to a source from which the client-side computing device acquired the file (e.g., an email address or an application), a domain name from which the client-side computing device acquired the file (e.g., download.com), a host or hostname from which the client-side computing device acquired the file (e.g., a767.ms.akamai.net), a URL from which the client-side computing device acquired the file (e.g., http://download.microsoft.com/download/), and/or an IP address from which the client-side computing device acquired the file (e.g., 64.208.241.72).

In some examples, a client-side computing device may use information about a trusted context (e.g., a context with a high reputation rating) to determine that a file acquired via the trusted context is trustworthy even though the file does not otherwise have enough reputation information associated with it to determine that the file is trustworthy.

The systems described herein may perform step 302 in a variety of ways. In one example, context-receiving module 104 may receive contextual information from client-side computing devices as part of collecting, aggregating, and/or analyzing data reported by a community of users. This reported information may enable reputation service 206 to update reputation information maintained by reputation service 206. Additionally or alternatively, context-receiving module 104 may receive contextual information from a client-side computing device as part of a request by the client-side computing device for reputation information. For example, a client-side computing device may include contextual information when requesting reputation information for a file. In this example, reputation service 206 may use the contextual information to provide a more accurate reputation rating for the file and/or provide additional reputation information associated with a context provided within the contextual information.

In another example, a client-side computing device may provide contextual information to context-receiving module 104 when reporting the results of one or more trustworthiness determinations made with respect to a file. For example, file-identification module 110 on computing device 202(N) may identify a file (such as file 210) downloaded by a user of computing device 202(N)). In an attempt to determine whether file 210 is trustworthy, reputation-requesting module 112 may request reputation information for file 210 from reputation service 206. In this example, reputation service 206 may provide reputation information to reputation-receiving module 114 on computing device 202(N) that indicates that file 210 should not be trusted due to its low prevalence within the community.

In some examples, however, trust-determining module 116 may determine that file 210 is trustworthy (even in view of the reputation information received from reputation service 206) due to the context in which computing device 202(N) acquired file 210. For example, trust-determining module 116 may determine that computing device 202(N) acquired file 210 from a known and trusted source, such as a URL with a reputation rating that satisfies a predetermined threshold (e.g., "90%"). In this example, trust-determining module 116 may determine that file 210 is trustworthy, despite its low prevalence within the community, due to originating from a known and trusted source, thereby exonerating file 210.

Upon determining that file 210 is trustworthy, trust-determining module 116 may then report to reputation service 206 contextual information (e.g., contextual information 500 in FIG. 5) containing information that both (1) identifies the context in which computing device 202(N) acquired file 210 and (2) indicates that computing device 202(N) determined that file 210 was trustworthy due to the context in which computing device 202(N) acquired file 210.

Figure 5:
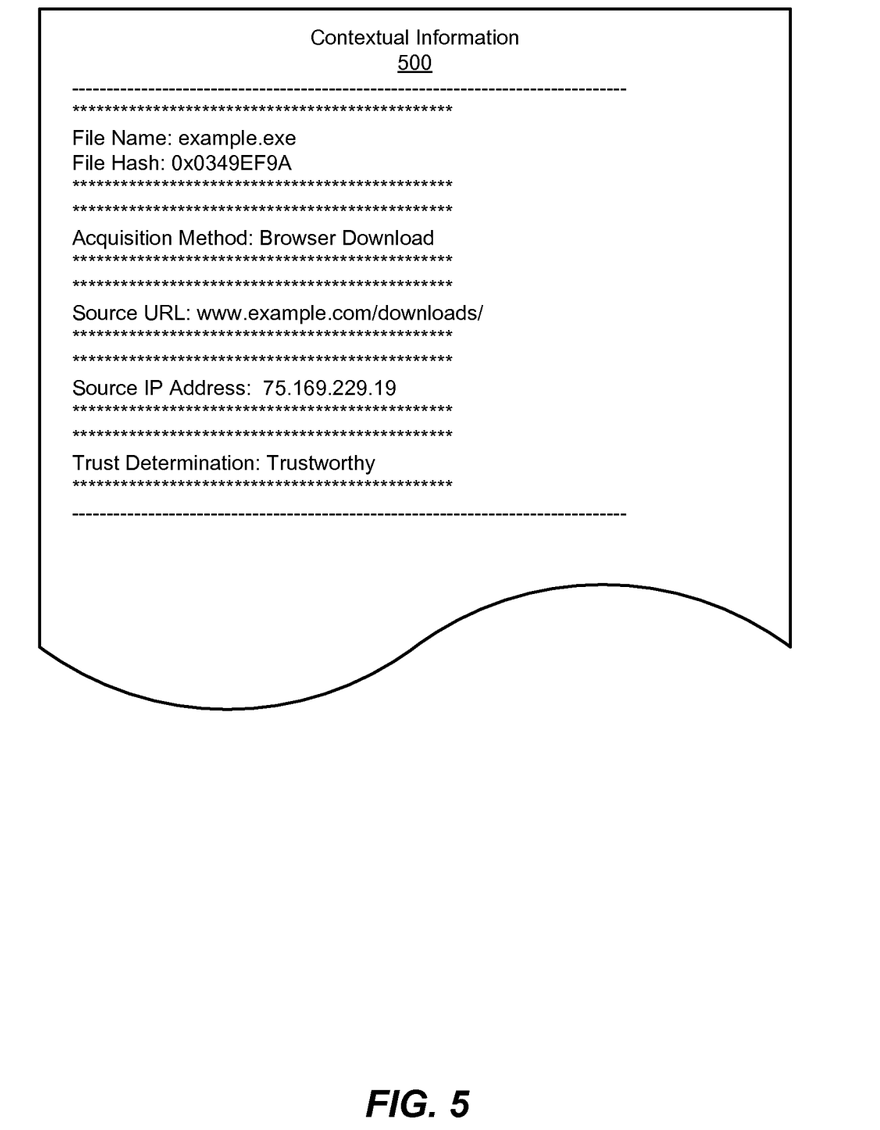
FIG. 5 is an illustration of exemplary contextual information.

FIG. 5 is an illustration of exemplary contextual information 500 that may be received from a client-side computing device. As illustrated in this figure, contextual information may include information that identifies the name of a file acquired by the client-side computing device (in this example, "example.exe"), a file hash that uniquely identifies the file (in this example, "0x0349EF9A"), the method by which the client-side computing device acquired the file (in this example, "Browser Download"), a source URL from which the client-side computing device acquired the file (in this example, "www.example.com/downloads/"), a source IP address from which the client-side computing device acquired the file (in this example, "75.169.229.19"), and a trust determination made with respect to the file (in this example, "Trustworthy").

In some examples, after receiving this contextual information, context-receiving module 104 may save the contextual information (e.g., as contextual information 122 within database 120).

At step 304, one or more of the systems described herein may determine, based at least in part on the contextual information received from the client-side computing device, a reputation rating for the file. For example, at step 304, reputation-determining module 106 may, as part of reputation service 206 in FIG. 2, determine a reputation rating for file 210 based at least in part on the contextual information received from computing device 202(N) as part of step 302.

As used herein, the terms "reputation rating" and "reputation information" may generally refer to information that indicates the trustworthiness of a file and/or whether the file represents a potential security risk. An example of a reputation rating includes, without limitation, a reputation score (e.g., 70%, on a scale of 1% to 100%, where, for example, a high reputation score indicates that the file is unlikely to represent a security risk and a low reputation score indicates that the file likely represents a security risk). In addition to files, reputation ratings may also be associated with other entities (e.g., contexts) that influence the reputation ratings of files and/or that can be otherwise used in determining reputation ratings for files. For example, a file acquired via a URL with a high reputation rating may be more likely to be trustworthy than a file acquired via a URL with a low reputation rating.

The systems described herein may perform step 304 in a variety of ways. In one example, reputation-determining module 106 may determine the reputation rating for the file by identifying a reputation rating associated with the context in which the client-side computing device acquired the file and then calculating, based at least in part on the reputation rating associated with the context in which the client-side computing device acquired the file, the reputation rating for the file. For example, reputation-determining module 106 may determine that a URL from which the client-side computing device acquired the file has a reputation rating of 75%. In this example, reputation-determining module 106 may calculate a reputation rating for the file by simply using the reputation rating for the URL as the reputation rating for the file (e.g., by assigning a reputation rating of 75% to the file).

If the file was acquired via a multi-factor context, reputation-determining module 106 may calculate the reputation rating for the file using reputation ratings for each contextual factor (e.g., by averaging or by taking the minimum of the reputation ratings of each contextual factor). In other examples, reputation-determining module 106 may calculate the reputation rating for the file using other reputation information associated with the file and/or the context by which it was acquired.

In some examples, reputation-determining module 106 may also calculate a hash that represents the file and then associate the reputation rating for the file with the hash that represents the file. In one example, this hash may represent a unique identifier for the file that can be used by client-side computing devices to request reputation information for the file and/or by reputation services to identify and/or provide reputation information for the file.

In another example, prior to associating the reputation rating for the file with the file and/or the hash that represents the file, reputation-determining module 106 may verify that the file is not a known-malicious file (perhaps to ensure that the file has not been classified as malware). For example, reputation-determining module 106 may query database 120 (which, as detailed above, contains information on known-malicious files 126) in order to ensure that the file is not a known-malicious file. In some examples, reputation-determining module 106 may also store the reputation rating within database 120 (e.g., as reputation information 124).

At step 306, one or more of the systems described herein may provide the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy. For example, at step 306, providing module 108 may, as part of reputation service 206 in FIG. 2, provide the reputation rating for file 210 to computing device 202(1) in order to prevent computing device 202(1) from falsely classifying file 210 as untrustworthy due to acquiring file 210 via a context that is insufficient to determine that file 210 is trustworthy.

In this way, a client-side computing device that would have otherwise been unable to determine that a file was trustworthy due to acquiring the file via an unknown or untrusted context may still determine that the file is trustworthy based on the fact that the same file was acquired by another client-side computing device via a context that allowed it to determine that the file was trustworthy.

The systems described herein may perform step 306 in a variety of ways. In one example, providing module 108 may provide the reputation rating for the file to the additional client-side computing device in response to a request (e.g., a request as described in step 404 of FIG. 4) from the additional client-side computing device for reputation information associated with the file. In one example, providing module 108 may respond to such a request for reputation information for the file by providing reputation information similar to reputation information 600 in FIG. 6.

Figure 6:
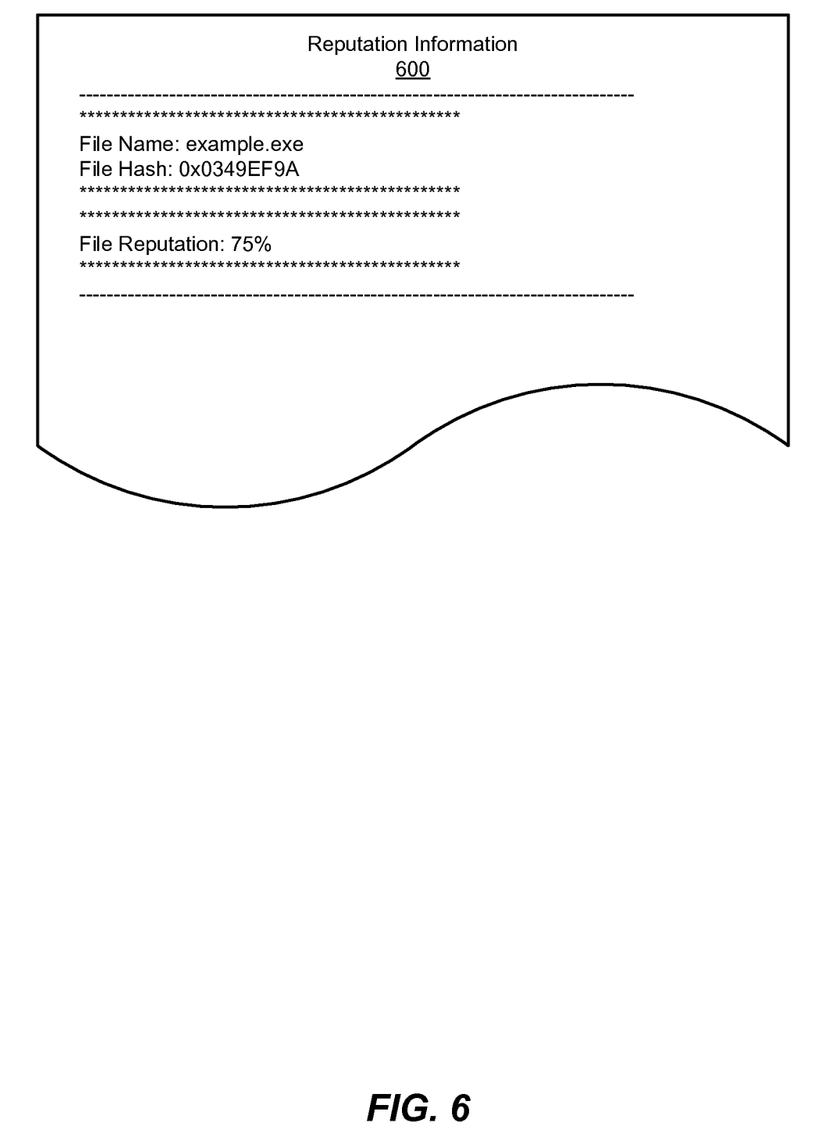
FIG. 6 is an illustration of exemplary reputation information.

FIG. 6 is an illustration of exemplary reputation information 600 that may be provided by a server-side computing device to a client-side computing device. As illustrated in this figure, reputation information may include information that identifies a name of a file (in this example, "example.exe"), a file hash that uniquely identifies the file (in this example, "0x0349EF9A"), and a reputation rating for the file (in this example 75%).

Returning to FIG. 3, additionally or alternatively, providing module 108 may provide the reputation rating for the file to the additional client-side computing device by sending the reputation rating to the additional client-side computing device prior to the additional client-side computing device acquiring the file. For example, the additional client-side computing device may maintain a reputation-information database (e.g., reputation information 124 within database 120), and providing module 108 may send the reputation rating for the file to the additional client-side computing device as part of updating the reputation-information database. Upon completion of step 308, exemplary method 300 in FIG. 3 may terminate.

Figure 4:
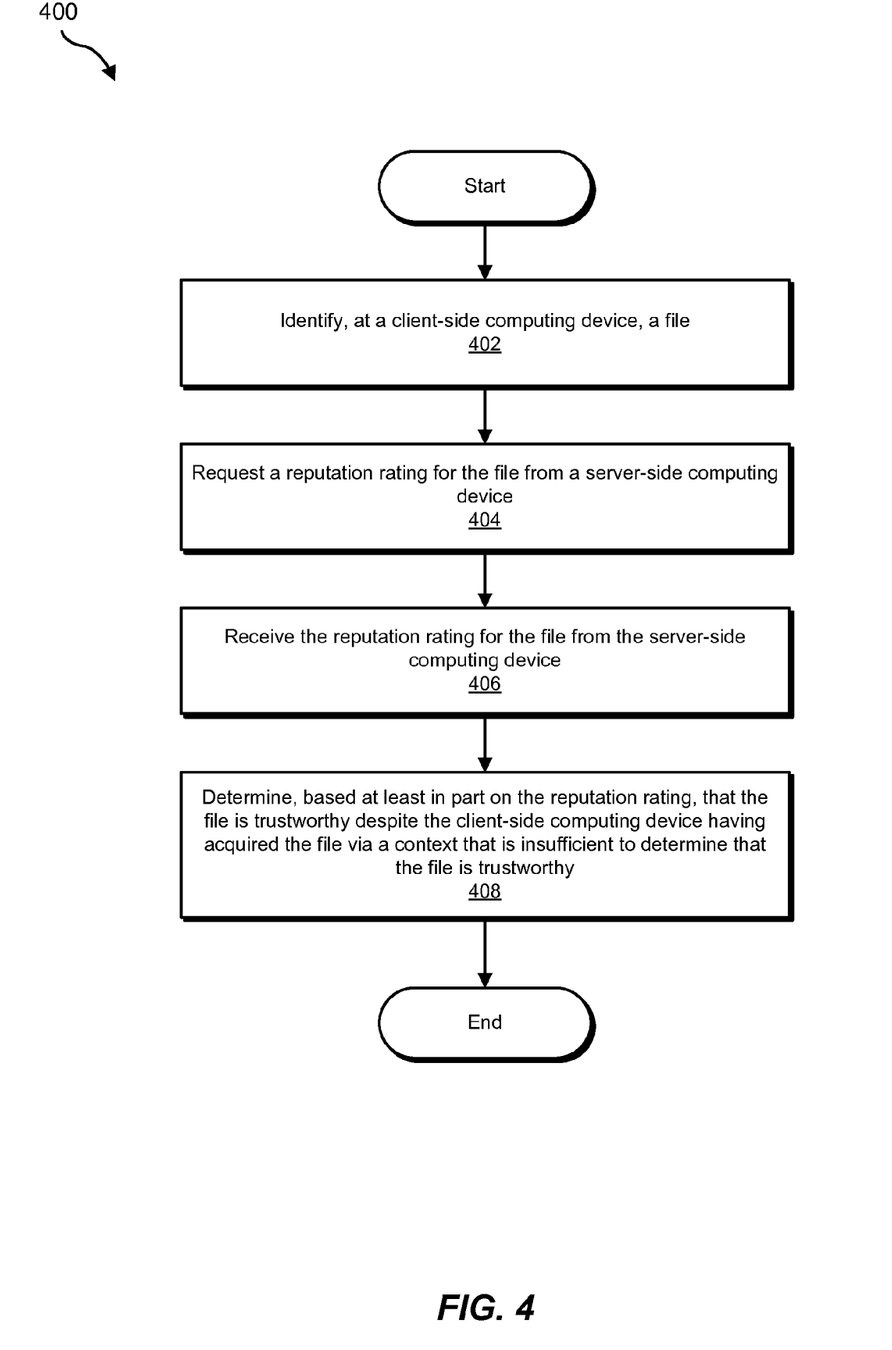
FIG. 4 is a flow diagram of an exemplary method for using acquisitional contexts to prevent false-positive malware classifications.

As detailed above, client-side computing devices may use the reputation ratings generated in exemplary method 300 in order to increase the accuracy of their trustworthiness determinations. FIG. 4 is a flow diagram of an exemplary computer-implemented method for performing such a task. The steps show in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 710 in FIG. 7, and/or portions of exemplary network architecture 800 in FIG. 8.

The steps shown in FIG. 4 illustrate how a client-side computing device (e.g., computing device 202(1)), that would have otherwise been unable to determine that a file was trustworthy due to acquiring the file via an unknown or untrusted context, may still determine that the file is trustworthy based on the fact that the same file was acquired by another client-side computing device (e.g., computing device 202(N)) via a context that allowed it to determine that the file was trustworthy.

At step 402, one or more of the systems described herein may identify, at a client-side computing device, a file. For example, at step 402, file-identification module 110 may, as part of computing device 202(1) in FIG. 2, identify file 210.

The systems described herein may perform step 402 in any suitable manner. In one example, file-identification module 110 may identify the file as part of monitoring files downloaded to and/or otherwise acquired by computing device 202(1). For example, file-identification module 110 may identify a file downloaded by a user via an Internet browser, received in an email message, and/or retrieved from a data storage device (e.g., a USB flash drive or a network storage device). Additionally or alternatively, file-identification module 110 may identify a file as part of receiving a request to determine whether the file is trustworthy (perhaps received from a user of computing device 202(1)).

At step 404, one or more of the systems described herein may request a reputation rating for the file from a server-side computing device. For example, at step 404 reputation-requesting module 112 may, as part of computing device 202(1) in FIG. 2, request a reputation rating for file 210 from reputation service 206.

The systems described herein may perform step 404 in a variety of ways. In one example, reputation-requesting module 112 may include in the request an identifier that identifies the file. For example, reputation-requesting module 112 may include in the request a file name of the file and/or a hash for the file.

In some examples, reputation-requesting module 112 may request the reputation rating after the file is identified by file-identification module 110. In other examples, reputation-requesting module 112 may request the reputation rating prior to file-identification module 110 identifying the file. For example, reputation-requesting module 112 may request the reputation rating as part of a request for general reputation information (e.g., as part of a registration process).

At step 406, one or more of the systems described herein may receive the reputation rating for the file from the server-side computing device. For example, at step 406 reputation-receiving module 114 may, as part of computing device 202 (1) in FIG. 2, receive the reputation rating for file 210 from reputation service 206. In this example, and as described in connection with FIG. 3, the reputation rating received from reputation service 206 may be based at least in part on an analysis of contextual information received from computing device 202(N) that indicates that computing device 202(N) determined that file 210 was trustworthy due to a context in which computing device 202(N) acquired file 210.

The systems described herein may perform step 406 in a variety of ways. In one example, reputation-receiving module 114 may receive the reputation rating as part of reputation information (e.g., reputation information 600 in FIG. 6). In some examples, upon receiving the reputation rating for the file, reputation-receiving module 114 may store the reputation rating (e.g., as reputation information 124 in database 120).

At step 408, one or more of the systems described herein may determine, based at least in part on the reputation rating received from the server-side computing device, that the file is trustworthy despite the client-side computing device having acquired the file via a context that is insufficient to determine that the file is trustworthy. For example, at step 408, trust-determining module 116 may, as part of computing device 202(1) in FIG. 2, determine, based at least in part on the reputation rating received from the reputation service 206, that file 210 is trustworthy despite having acquired file 210 via a context that is insufficient to determine that file 210 is trustworthy.

The systems described herein may perform step 408 in a variety of ways. In one example, trust-determining module 116 may determine that the file is trustworthy by determining that the reputation rating of the file is above a predetermined amount (e.g., a 70% reputation rating may indicate that the file is trustworthy). For example, the reputation rating provided in reputation information 600 in FIG. 6 may allow trust-determining module 116 to determine that the file is trustworthy. In other examples, trust-determining module 116 may determine that the file is trustworthy using other reputation information associated with the file and/or the context by which it was acquired. Upon completion of step 408, exemplary method 400 in FIG. 4 may terminate.

As explained above, by determining reputation ratings for files based on information that identifies the context in which such files were acquired, the systems and methods described herein may prevent reputation-based security systems from falsely classifying legitimate files as malware. Furthermore, by propagating such reputation ratings within a community of users, the systems and methods described herein may ensure that a file that is trusted on one computing device due to the context in which the file was acquired (e.g., a trusted source) is also trusted on an additional computing device even if the file is acquired at the additional computing device via a context (e.g., an untrusted source) that is insufficient to determine that the file is trustworthy.

Figure 7:
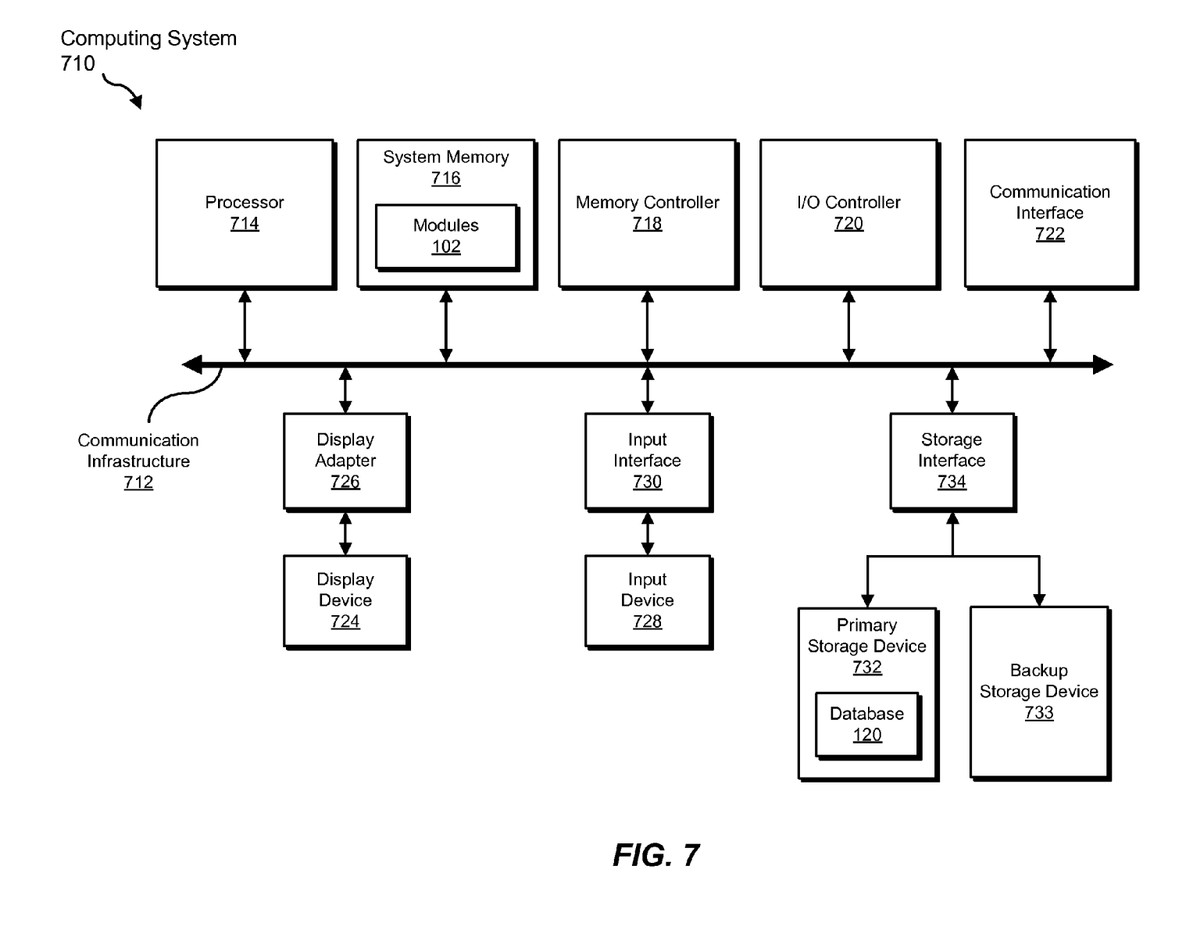
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the preventing, receiving, determining, providing, calculating, associating, verifying, requesting, and identifying steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
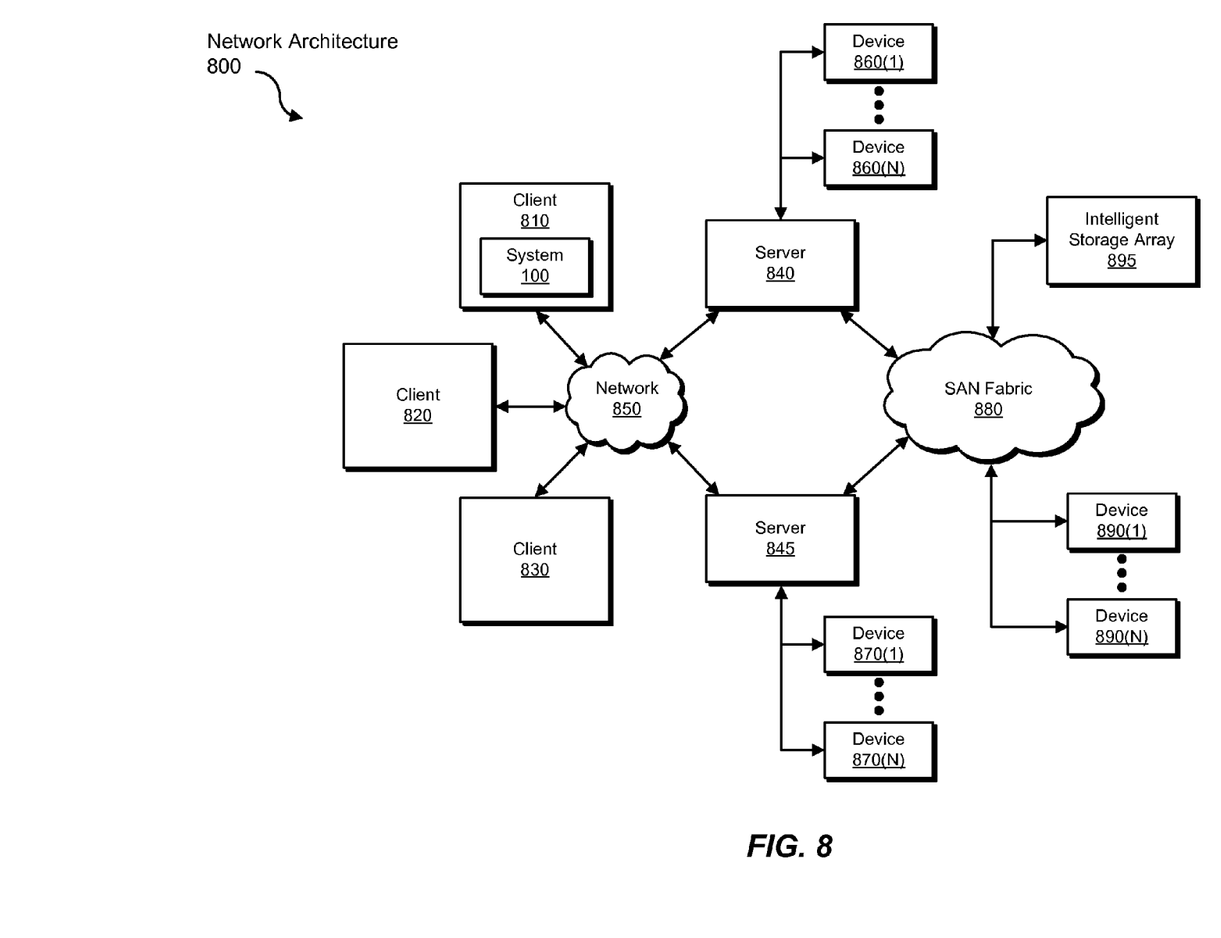
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the preventing, receiving, determining, providing, calculating, associating, verifying, requesting, and identifying steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for using acquisitional contexts to prevent false-positive malware classifications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.)

may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of using acquisitional contexts to prevent false-positive malware classifications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using acquisitional contexts to prevent false-positive malware classifications, at least a portion of the method being performed by a server-side computing device comprising at least one processor, the method comprising:
   receiving, from at least one client-side computing device within a community of users, contextual information associated with a file, wherein the contextual information:
      identifies a context in which the client-side computing device acquired the file;
      indicates that the client-side computing device exonerated the file due to the context in which the client-side computing device acquired the file after receiving, from the server-side computing device, reputation information for the file that indicated that the file should not be trusted due to the file's low prevalence within the community;
   using, based at least in part on the file having been exonerated at the client-side computing device due to the context in which the client-side computing device acquired the file after receiving reputation information for the file that indicated that the file should not be trusted due to the file's low prevalence within the community, the context in which the client-side computing device acquired the file to determine a reputation rating for the file;
   providing the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy.

2. The method of claim 1, wherein the context in which the client-side computing device acquired the file comprises at least one of:
   a trusted source from which the client-side computing device acquired the file;
   a trusted domain name from which the client-side computing device acquired the file;
   a trusted hostname from which the client-side computing device acquired the file;
   a trusted uniform resource locator from which the client-side computing device acquired the file.

3. The method of claim 1, wherein using the context in which the client-side computing device acquired the file to determine the reputation rating for the file comprises:
   identifying a reputation rating associated with the context in which the client-side computing device acquired the file;
   calculating, based at least in part on the reputation rating associated with the context in which the client-side computing device acquired the file, the reputation rating for the file.

4. The method of claim 1, wherein using the context in which the client-side computing device acquired the file to determine the reputation rating for the file comprises:
   calculating a hash that represents the file;
   associating the reputation rating for the file with the hash that represents the file.

5. The method of claim 1, wherein using the context in which the client-side computing device acquired the file to determine the reputation rating for the file comprises verifying that the file is not a known-malicious file.

6. The method of claim 1, wherein the client-side computing device exonerated the file based at least in part on reputation information associated with the context in which the client-side computing device acquired the file.

7. The method of claim 1, wherein the client-side computing device exonerated the file due to the context in which the client-side computing device acquired the file by:
   obtaining reputation information for a source from which the client-side computing device acquired the file that indicates that the source was trustworthy;
   determining, based at least in part on the reputation information for the source from which the client-side computing device acquired the file, that the file was trustworthy.

8. A computer-implemented method for using acquisitional contexts to prevent false-positive malware classifications, at least a portion of the method being performed by a client-side computing device comprising at least one processor, the method comprising:
- identifying, at the client-side computing device, a file;
- requesting a reputation rating for the file from a server-side computing device;
- receiving the reputation rating for the file from the server-side computing device, wherein the server-side computing device determined the reputation rating for the file by:
  - analyzing contextual information received from at least one other client-side computing device within a community of users that indicates that the other client-side computing device exonerated a prior instance of the file due to a context in which the other client-side computing device acquired the prior instance of the file after receiving, from the server-side computing device, reputation information for the prior instance of the file that indicated that the prior instance of the file should not be trusted due to the prior instance of the file's low prevalence within the community;
  - using, based at least in part on the prior instance of the file having been exonerated at the other client-side computing device due to the context in which the other client-side computing device acquired the prior instance of the file after receiving reputation information for the prior instance of the file that indicated that the prior instance of the file should not be trusted due to the prior instance of the file's low prevalence within the community, the context in which the other client-side computing device acquired the prior instance of the file to determine the reputation rating for the file;
- determining, based at least in part on the reputation rating received from the server-side computing device, that the file is trustworthy despite the client-side computing device having acquired the file via a context that is insufficient to determine that the file is trustworthy.

9. The method of claim 8, wherein the context in which the other client-side computing device acquired the prior instance of the file comprises at least one of:
- a trusted source from which the other client-side computing device acquired the prior instance of the file;
- a trusted domain name from which the other client-side computing device acquired the prior instance of the file;
- a trusted hostname from which the other client-side computing device acquired the prior instance of the file;
- a trusted uniform resource locator from which the other client-side computing device acquired the prior instance of the file.

10. The method of claim 8, wherein the server-side computing device determined the reputation rating for the file by:
- identifying a reputation rating associated with the context in which the other client-side computing device acquired the prior instance of the file;
- calculating, based at least in part on the reputation rating associated with the context in which the other client-side computing device acquired the prior instance of the file, the reputation rating for the file.

11. The method of claim 8, wherein the server-side computing device determined the reputation rating for the file by:
- calculating a hash that represents the prior instance of the file and the file;
- associating the reputation rating for the file with the hash that represents the prior instance of the file and the file.

12. The method of claim 8, wherein the server-side computing device determined the reputation rating for the file by verifying that the prior instance of the file was not a known-malicious file.

13. The method of claim 8, wherein the other client-side computing device exonerated the prior instance of the file based at least in part on reputation information associated with the context in which the other client-side computing device acquired the prior instance of the file.

14. The method of claim 8, wherein the other client-side computing device exonerated the prior instance of the file due to the context in which the other client-side computing device acquired the prior instance of the file by:
- obtaining reputation information for a source from which the other client-side computing device acquired the prior instance of the file that indicates that the source was trustworthy;
- determining, based at least in part on the reputation information for the source from which the other client-side computing device acquired the prior instance of the file, that the prior instance of the file was trustworthy.

15. A system for using acquisitional contexts to prevent false-positive malware classifications, the system comprising:
- a context-receiving module programmed to receive, at a server-side computing device from at least one client-side computing device within a community of users, contextual information associated with a file, wherein the contextual information:
  - identifies a context in which the client-side computing device acquired the file;
  - indicates that the client-side computing device exonerated the file due to the context in which the client-side computing device acquired the file after receiving, from the server-side computing device, reputation information for the file that indicated that the file should not be trusted due to the file's low prevalence within the community;
- a reputation-determining module programmed to use, based at least in part on the file having been exonerated at the client-side computing device due to the context in which the client-side computing device acquired the file after receiving reputation information for the file that indicated that the file should not be trusted due to the file's low prevalence within the community, the context in which the client-side computing device acquired the file to determine a reputation rating for the file;
- a providing module programmed to provide the reputation rating for the file to at least one additional client-side computing device within the community in order to prevent the additional client-side computing device from falsely classifying the file as untrustworthy due to acquiring an additional instance of the file via a context that is insufficient to determine that the additional instance of the file is trustworthy;
- at least one processor configured to execute the context-receiving module, the reputation-determining module, and the providing module.

16. The system of claim 15, further comprising:
- a file-identification module programmed to identify, at the additional client-side computing device, the additional instance of the file;
- a reputation-requesting module programmed to request a reputation rating for the additional instance of the file from the server-side computing device;

a reputation-receiving module programmed to receive the reputation rating for the additional instance of the file from the server-side computing device;

a trust-determining module programmed to determine, based at least in part on the reputation rating received from the server-side computing device, that the additional instance of the file is trustworthy despite the additional client-side computing device having acquired the additional instance of the file via a context that is insufficient to determine that the additional instance of the file is trustworthy, wherein the processor is further configured to execute the file-identification module, the reputation-requesting module, the reputation-receiving module, and the trust-determining module.

17. The system of claim 15, wherein the context in which the client-side computing device acquired the file comprises at least one of:
- a trusted source from which the client-side computing device acquired the file;
- a trusted domain name from which the client-side computing device acquired the file;
- a trusted hostname from which the client-side computing device acquired the file;
- a trusted uniform resource locator from which the client-side computing device acquired the file.

18. The system of claim 15, wherein the determination module is programmed to use the context in which the client-side computing device acquired the file to determine the reputation rating for the file by:
- identifying a reputation rating associated with the context in which the client-side computing device acquired the file;
- calculating, based at least in part on the reputation rating associated with the context in which the client-side computing device acquired the file, the reputation rating for the file.

19. The system of claim 15, wherein the determination module is programmed to use the context in which the client-side computing device acquired the file to determine the reputation rating for the file by:
- calculating a hash that represents the file;
- associating the reputation rating for the file with the hash that represents the file.

20. The system of claim 15, wherein the client-side computing device exonerated the file based at least in part on reputation information associated with the context in which the client-side computing device acquired the file.

* * * * *